United States Patent [19]
Stout

[11] Patent Number: 6,149,080
[45] Date of Patent: Nov. 21, 2000

[54] HOPPER SPREADER FOR A TRUCK BOX

[75] Inventor: Peter Rousay Stout, Yorkton Saskatchewan, Canada

[73] Assignee: Her Majesty the Queen in the right of Canada, as represented by the Province of Saskatchewan

[21] Appl. No.: 09/433,085

[22] Filed: Nov. 3, 1999

[51] Int. Cl.⁷ ..................................................... A01L 17/00
[52] U.S. Cl. .......................................... 239/682; 239/683
[58] Field of Search ................................... 239/657, 668, 239/676, 667, 682, 683, 689

[56] References Cited

U.S. PATENT DOCUMENTS

| | | | |
|---|---|---|---|
| 971,436 | 9/1910 | Funk | 239/667 |
| 1,011,624 | 12/1911 | Johnson et al. | 239/667 |

*Primary Examiner*—Andres Kashnikow
*Assistant Examiner*—Davis Hwu
*Attorney, Agent, or Firm*—Ronald C. Fish; Falk & Fish

[57] ABSTRACT

The spreader comprises an elongated hopper which is mountable across the rear end of a truck box in an underslung fashion. When the end-gate of the box is opened, aggregate can spill into the hopper. The hopper forms a discharge slot along its lower end. A pair of coaxial, end-to-end drums are rotatably mounted in the hopper and extend into the lower portion of the slot. Each drum is separately driven. A ramp extends between the box floor and the front upper quadrants of the drums for feeding aggregate thereto. A pair of separately actuated, pivoting flaps bear against the upper rear quadrants of the drums and function to open or close the upper portion of the slot. The ramp/drum assembly provides even, well distributed discharge of aggregate. The flap/drum assemblies can provide an effective shut-off or lay down narrow or wide strips of aggregate.

4 Claims, 7 Drawing Sheets

HOPPER SPREADER FOR A TRUCK BOX

FIELD OF THE INVENTION

The present invention relates to a hopper spreader for use in spreading aggregate from a truck box onto a roadway.

BACKGROUND OF THE INVENTION

The invention was developed in connection with spreading aggregate onto a thin layer of liquid asphalt to produce a seal coat for an existing asphalt roadway. Its design has been influenced by the problems associated with that type of operation. However the spreader has been shown to work with other granular feed materials, such as asphalt pre-mix. Thus the term "aggregate", as used herein, is to be given a broad interpretation.

Historically, aggregate was hand shoveled from the truck box. More recently, detachable hopper-type spreaders have been commercially available, equipped with augers or rollers for laterally distributing and feeding the aggregate through gate-controlled slots. However, these prior art systems have commonly been characterized by several problems namely:

uneven feeding of the aggregate;

dropping the aggregate from too high an elevation so that splashing of the asphalt away from the aggregate pebbles occurs;

imperfect shut-off, with the result that aggregate can leak onto the roadway when not desired; and the inability to vary the width of the strip of aggregate laid down.

The present invention was developed with the objective of providing a hopper spreader whose performance is improved with respect to these problems.

SUMMARY OF THE INVENTION

The spreader is adapted to be detachably secured to the rear end of a truck box. It comprises a hopper which extends the width of the truck box and is underslung to hang below the box floor. A slot is formed by the hopper at its lower end. The slot extends the length of the hopper. A pair of cylindrical drums, arranged in coaxial end-to-end relationship, are positioned in and are mounted to the hopper. The drums extend the length of the slot and project through its lower portion. A ramp is positioned in the hopper and extends along the length of the drums. It slants downwardly between the rear end of the truck box floor and the upper front quadrants of the drums. The ramp functions to convey the aggregate, spilling from the box, to the drums in the form of a thin layer. The drums are rotatably mounted to the hopper end walls at their outer ends. At their inner ends they are rotatably supported by an internal bearing means. A pair of drive assemblies are provided for separately rotating the drums, so that they can be operated either singly or simultaneously. A pair of pivotable flap assemblies are provided for sealing or closing the upper portion of the slot. Each flap assembly bears against the upper rear quadrant of one of the drums. The flap assembly includes means for actuating each flap and firmly pressing it against its associated drum.

By combining these elements to provide a preferred embodiment, the spreader is characterized by the following improvements:

the provision of the separately driven drum sections, coupled with separately operated closure flaps, enables the aggregate to be delivered in narrow strips or, alternatively, of full-box width;

the underslung arrangement of the hopper brings it closer to the liquid asphalt (in the case of applying a seal coat) and reduces splashing; and the utilization of the ramp in conjunction with the feed drum assembly results in an even delivery of the aggregate.

Broadly stated, the invention involves a hopper spreader for use with a truck box to spread aggregate, comprising: an elongated hopper adapted to be mounted across the rear end of a truck box in an underslung position for receiving aggregate from the box; the hopper having side, front and rear walls and forming an elongated slot in its lower end for discharging aggregate; the slot having upper and lower portions; a pair of drums arranged in coaxial end-to-end relationship and being positioned within the hopper, said drums extending along and protruding through the lower portion of the slot, said drums being rotatably supported at their outer ends by the hopper end walls and being rotatably supported and connected at their inner ends by internal bearing means; drive means for separately rotating each drum; the hopper front wall comprising ramp means, for extending between the rear lip of the truck box and the drums, for conveying aggregate to the drums; a pair of flap assemblies, pivotally mounted to the hopper, for opening and closing the upper portions of the slot above the pair of drums; and means for separately actuating each of the flap assemblies; whereby the drums and flap members can be selectively operated to deposit either a narrow or wide strip of aggregate.

DESCRIPTION OF THE PREFERRED EMBODIMENT

In general, the spreader 1 comprises a hopper 2 forming a discharge slot 3 at its lower end. A feed drum assembly 4, comprising a pair of cylindrical drums 5,6, is positioned within the hopper chamber 7 and protrudes through the lower portion of the slot 3. A ramp 8 extends between the floor of the truck box 9 and the upper front quadrant of the drum assembly 4. An agitator 10 is positioned in the hopper chamber 7 just above the ramp 8. A pair of drive assemblies 12, 13 separately actuate the drums 5,6. Flap assemblies 14, 15 seal the upper portions of the slot 3 above the drums 5,6. Crank assemblies 16, 17 separately actuate the flap assemblies 14, 15.

The hopper 2 comprises a rear wall 20 connected to a pair of vertical, spaced apart end walls 21, 22. Each end wall 21, 22 has a pin 23 protruding outwardly from its upper front corner. (By "front" is meant that side of the hopper adjacent the end of the truck box.) A pair of horizontal brackets 25 extend rearwardly from the side walls 26 of the truck box 9. Each bracket 25 forms an upwardly opening slot 27 at its rear end. The end wall pins 23 drop into the slots 27 to suspend the hopper 2 from the brackets 25 and truck box 9. In addition, a strap 28 extends upwardly from the upper end of each hopper end wall 21, 22. The strap 28 forms openings 29 along its length to enable the strap to connect with a pin 30 protruding from the adjacent truck box side wall 26. The straps 28 can adjust the tilt of the hopper 2 about the end wall pins 23.

A pair of removable wings 60 are bolted to the rear ends of the truck box side walls 26 and project rearwardly. The wings 60 serve to contain aggregate from spilling sideways when the pivoting end-gate 61 of the truck box 9 opens.

The rear gate 61 is normally held closed by a latch mechanism 62. When the latch mechanism is opened and the truck box is tilted, the end-gate 61 swings open.

A downwardly and rearwardly slanting ramp 8 extends between and is connected to the end walls 21, 22. The ramp 8 forms the front wall of the hopper 2. At its upper front end, the ramp 8 forms a lip 32 which seats on the rear corner of the truck box floor.

From the foregoing, it will be noted that the hopper 2 is open at its front. It can be easily attached to or removed from the truck box 9 and assumes an underslung position to extend down from the box floor, so that aggregate may flow from the box into the hopper.

The rear wall 20 of the hopper 2 comprises a fixed angle member 33 extending between and connected to the hopper end walls 21,22. Pins 34 project inwardly from each hopper end wall above the angle member 33. A lower J-shaped wall section 35 hangs from the pins 34 and its lower edge abuts the angle member 33. A second pair of pins 36 project inwardly from the hopper end walls 21, 22 forwardly of and just above the pins 34. A third pair of pins 37 project inwardly from the upper rear portions of the hopper end walls 21, 22. An upper J-shaped wall section 38 hangs from the pins 37 and is locked between the pins 36 and the lower J-shaped wall section 35. From the foregoing it will be understood that the hopper rear wall 20 is formed of removable sections 35, 38; it closes off the rear of the hopper 2 and provides the upper margin of the slot 3; and it functions to contain the aggregate moving rearwardly along the ramp 8.

The drum assembly 4 comprises a pair of coaxial drums 5, 6 mounted end-to-end. Each drum 5 or 6 has a protruding axial stub shaft 40 at its outer end. The stub shafts 40 extend through and are rotatably mounted in the hopper end walls 21, 22. A sprocket 42 is mounted to each stub shaft 40 for connection with a drive assembly 12 or 13.

At their inner ends, the drums 5,6 are supported by an internal bearing assembly 43. The bearing assembly comprises a pair of vertical annular flanges 44 positioned in the drum 5. A sleeve 45 is positioned in drum 6 and a pair of bearings 46 are mounted internally of the sleeve. A shaft 47 extends through the bearings 46 and flanges 44. The bearing assembly 43 thus functions to connect and rotatably support the inner ends of the drums 5,6. Each drum is free to rotate independently, yet the drums combine to form a continuous cylinder.

Each drum 5,6 carries a spirally wound wire 48 on its outer surface. The wires 48 function in the manner of auger flights to help draw aggregate from the hopper chamber 7.

Turning now to the agitator 10, it comprises a shaft 50 extending through and rotatably mounted in the end walls 21, 22. The shaft carries paddles 51 at intervals along its length, for breaking up aggregate lumps and advancing the aggregate across the ramp 8. A sprocket 52 is mounted to each protruding end of the agitator shaft 50.

A pair of hydraulic motors 53 are mounted to the hopper end walls 21, 22 on their inner surfaces. Each motor 53 has an output shaft carrying a sprocket 54. A chain 55 drivably connects the motor sprocket 54, agitator sprocket 52 and drum sprocket 42 at each end wall, for rotation. The hydraulic motors 53 are actuated by hydraulic fluid supplied by hoses (not shown) from the truck hydraulic system (not shown). In summary then, the motor 53, chain 55 and sprockets 54, 52, 42 at each end wall combine to provide drive means for rotating the agitator 10 and adjacent drum 5 or 6.

Figure 1:
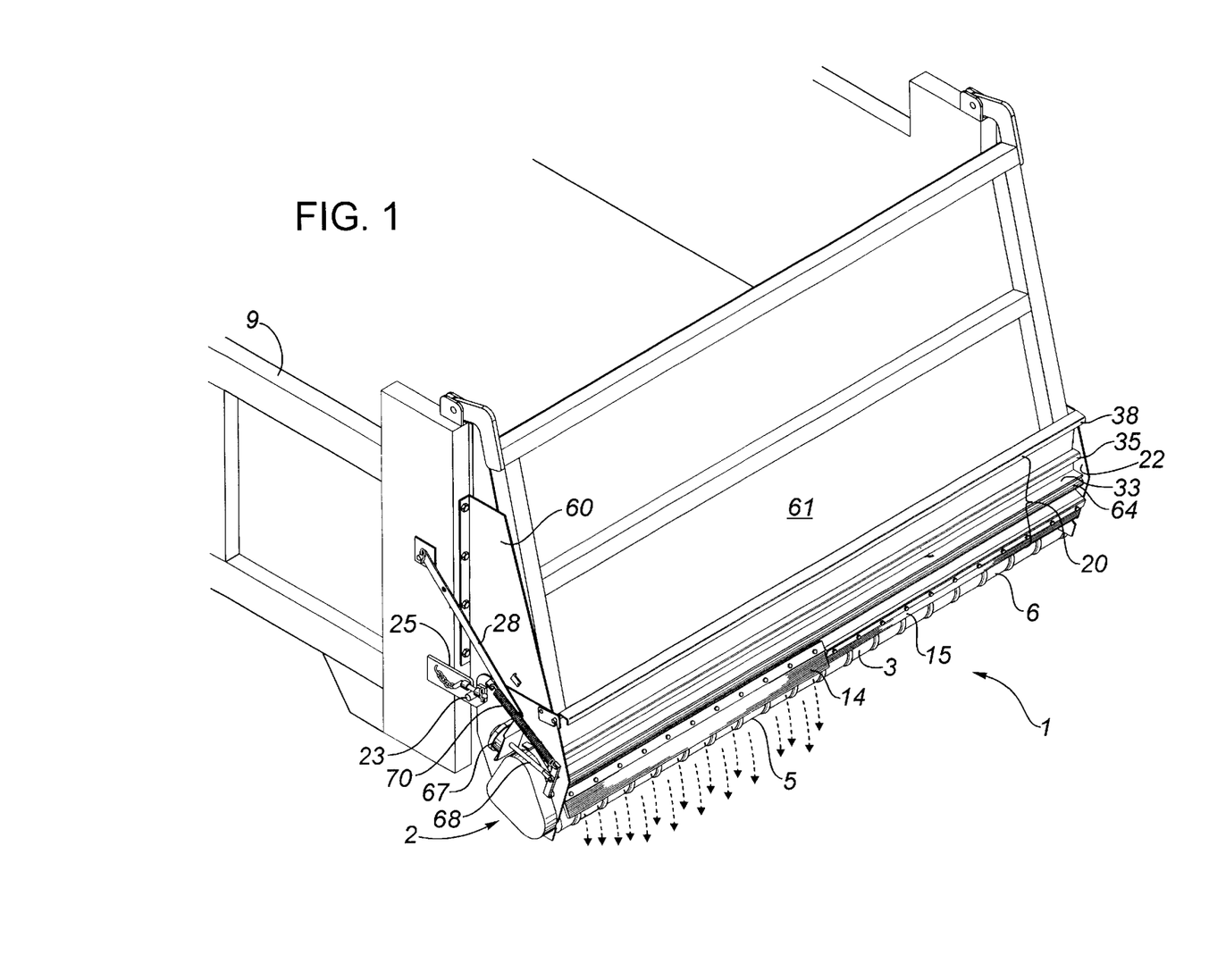
FIG. 1 is a perspective view showing the spreader attached to the rear end of a truck box, with one drum assembly distributing aggregate and the other closed.
Figure 2:
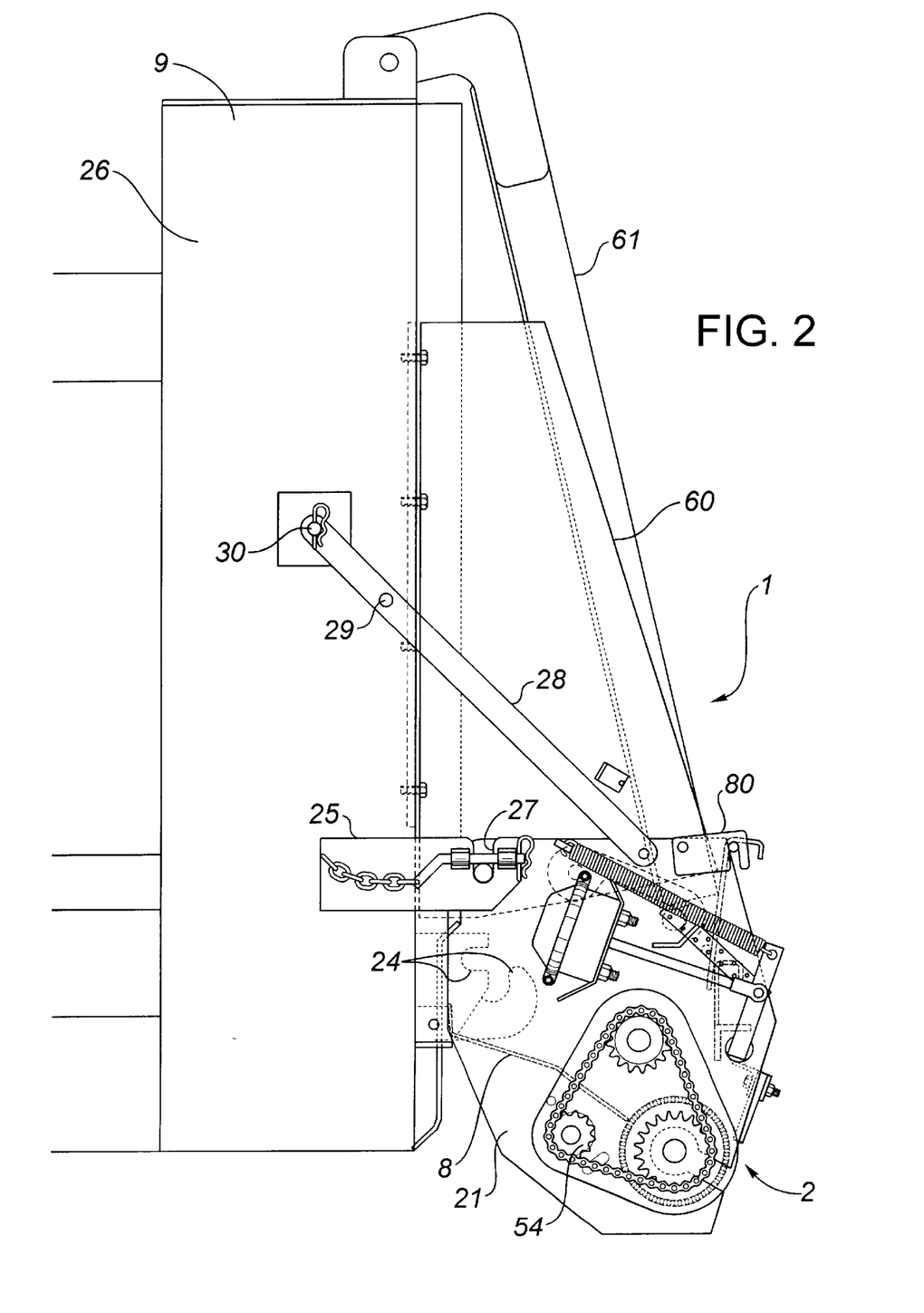
FIG. 2 is an end view of the spreader mounted on a truck box, with the truck box end-gate open, some internal components of the spreader shown in broken lines and the flap closure means shown in the closed position.
Figure 3:
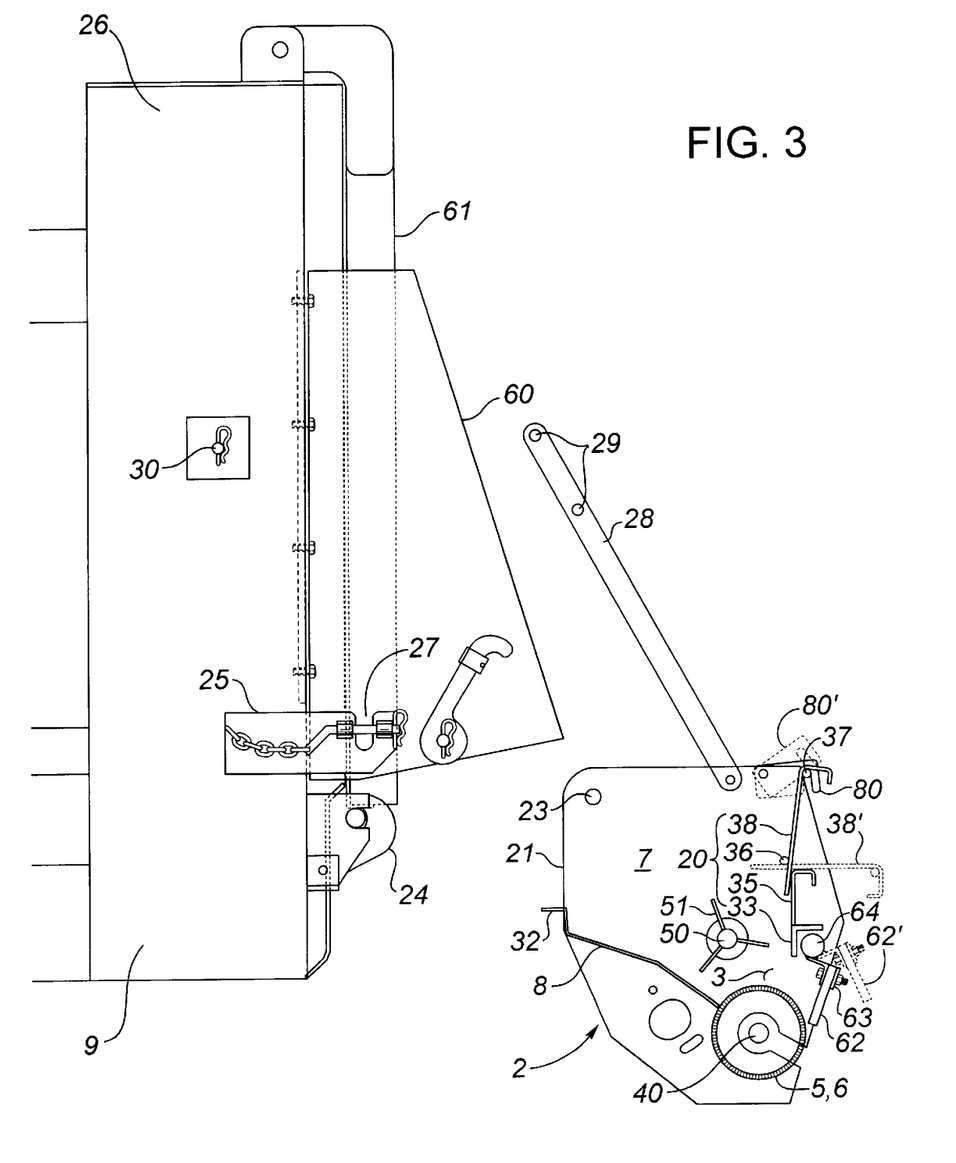
FIG. 3 is an end view showing the spreader mounting assembly on a truck box, with the end-gate closed, and the spreader separated therefrom, the spreader having some parts omitted, some internals shown in broken lines, and one closure flap open and the other closed.
Figure 4:
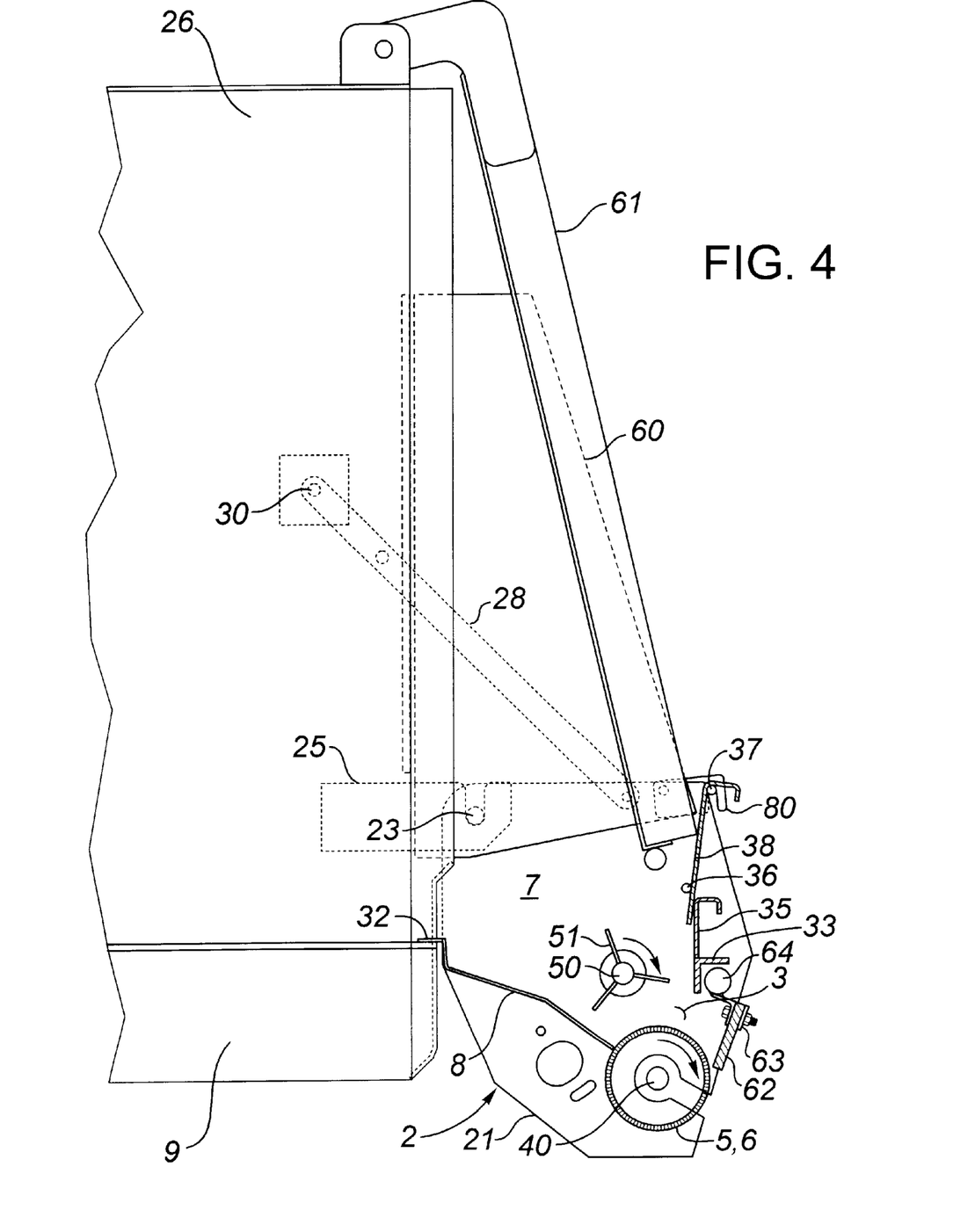
FIG. 4 is a side view of the spreader, showing internal components.
Figure 5:
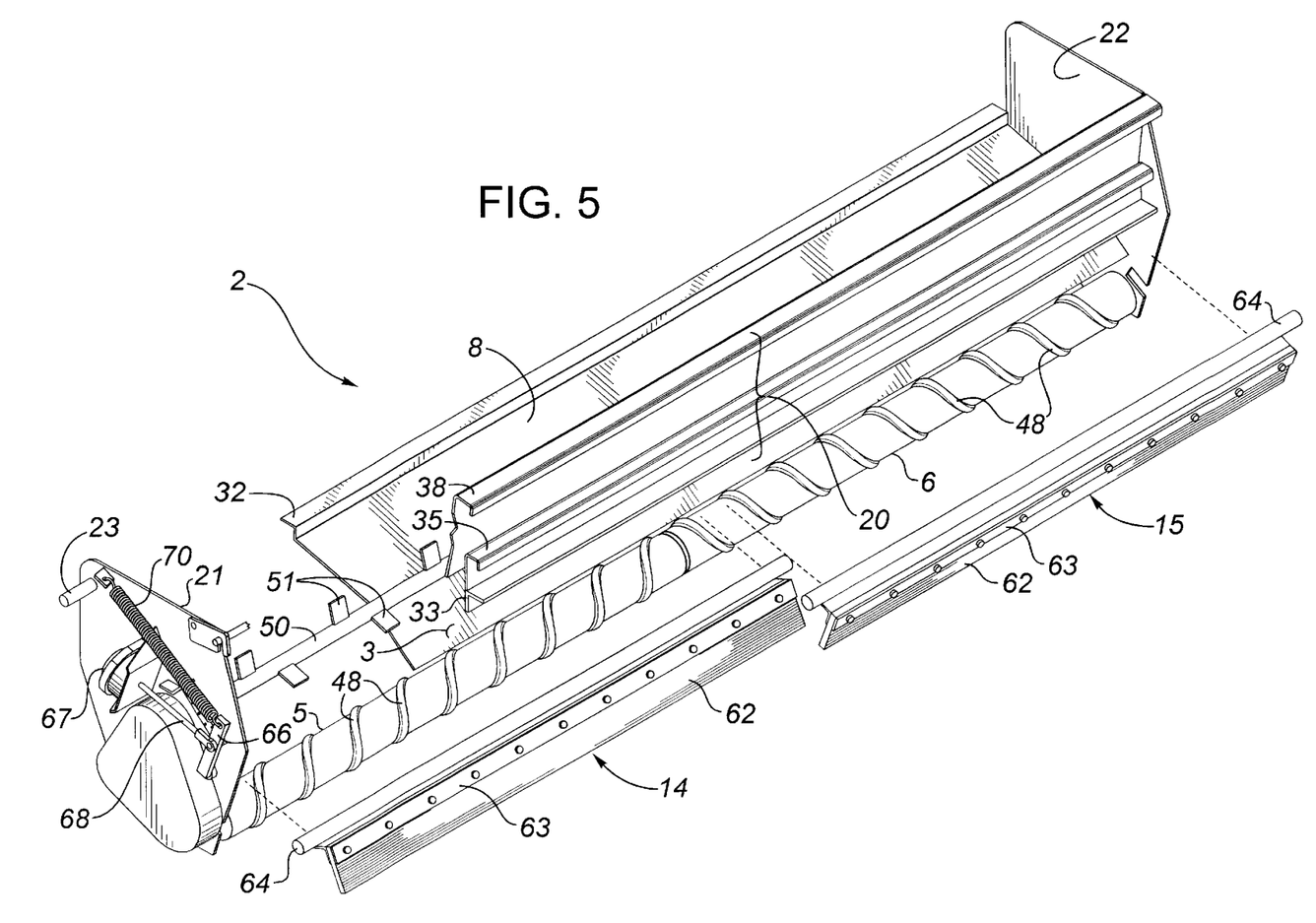
FIG. 5 is a perspective view of the spreader showing internal components.
Figure 6:
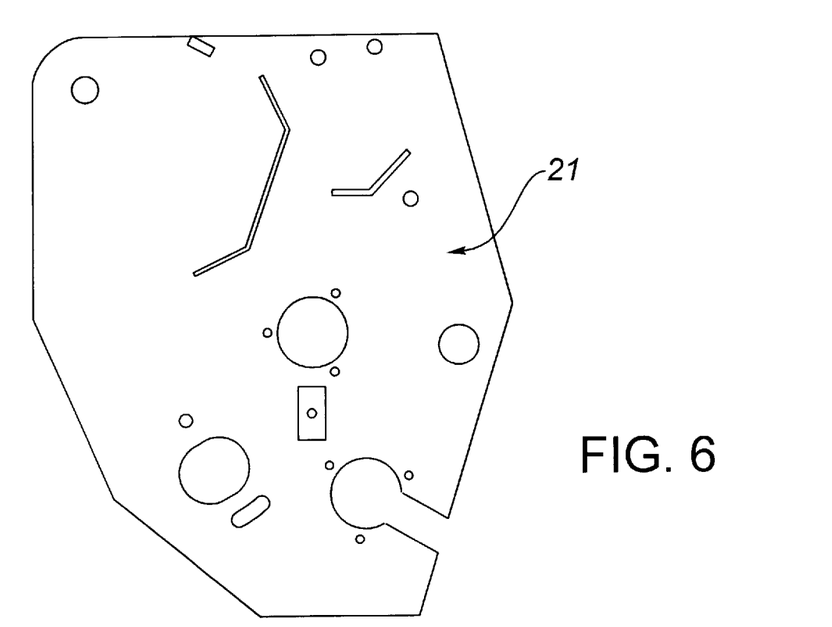
FIG. 6 is an end view of the outer surface of one of the hopper end plates.
Figure 7:
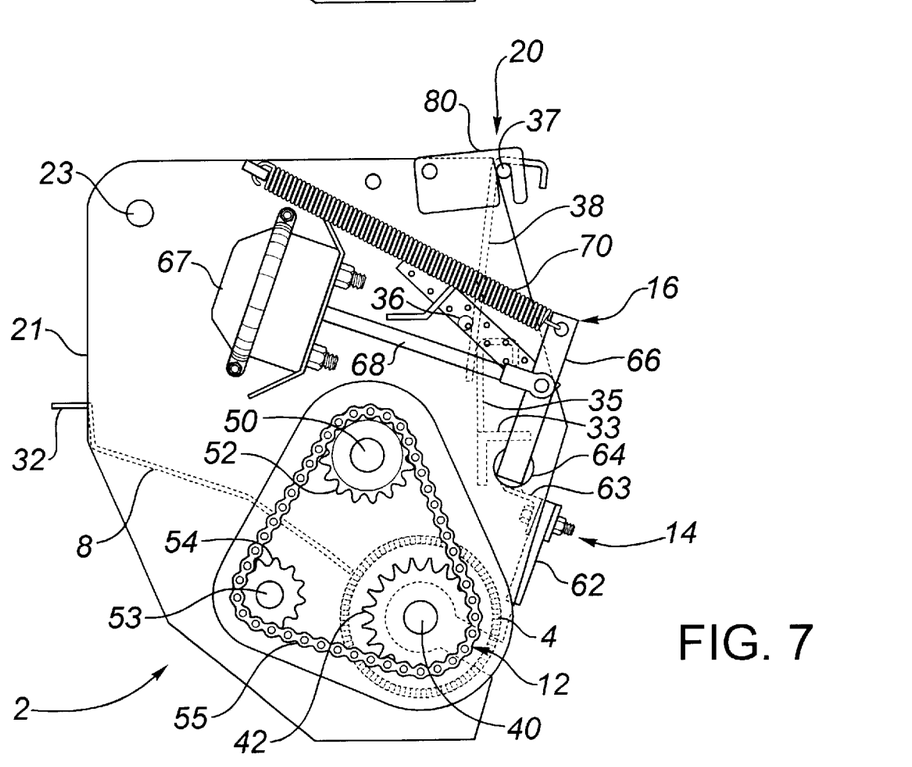
FIG. 7 is an end view of the hopper, showing the external components with the chain housing removed and with the rear end wall and flap closure shown in broken lines.
Figure 8:
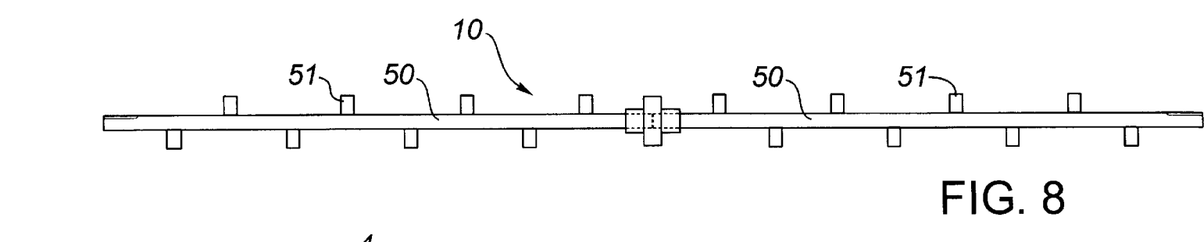
FIG. 8 is a front view of the agitator.
Figure 9:
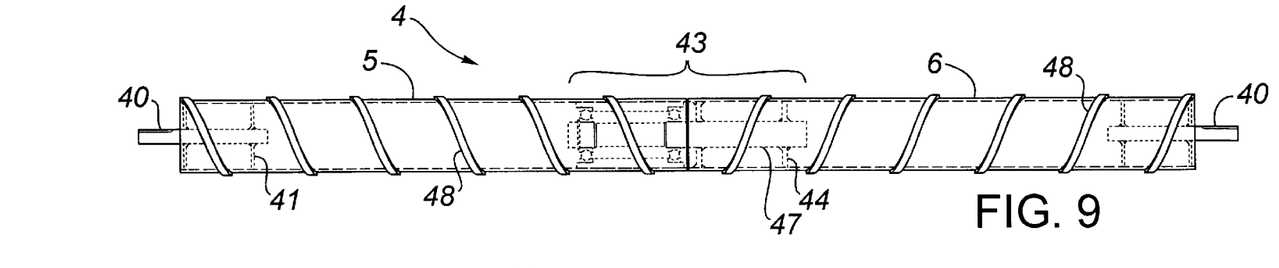
FIG. 9 is a front view of the portion of the drum assembly with internals shown in dotted lines.
Figure 10:
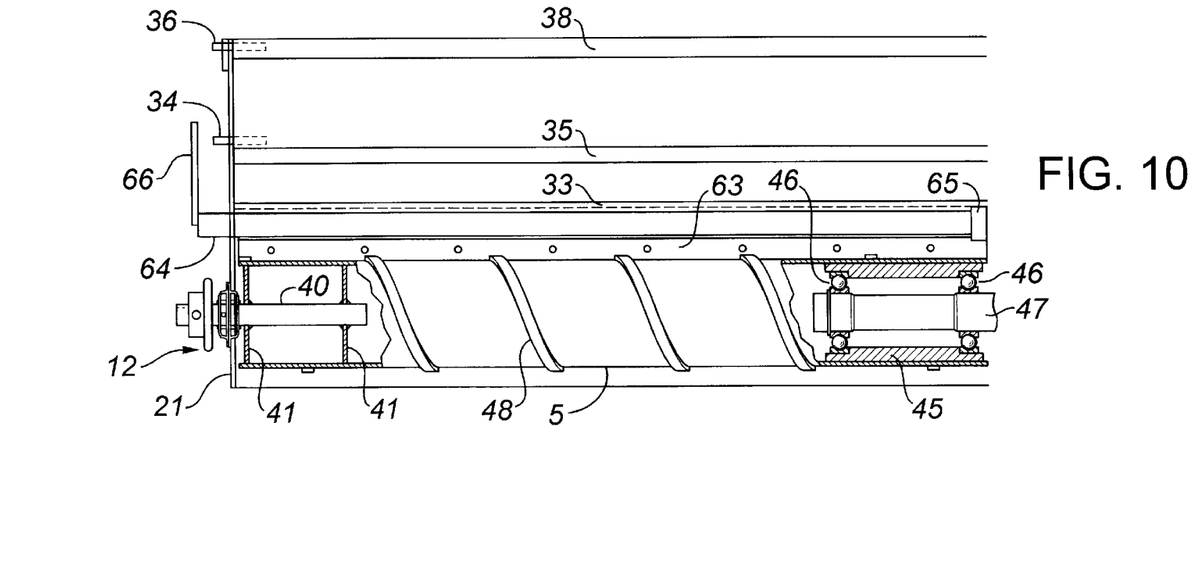
FIG. 10 is an end sectional view of one end of the drum assembly.

A pair of flap assemblies 14, 15 are provided to control the open upper portions of the slot 3. The flap assemblies are similar, so only one will be described. Each flap assembly comprises an elongated rubber flap 62 bolted to a bracket 63 which is secured to a shaft 64. The shaft 64 is rotatably supported at its inner and outer ends by a lug 65, connected to the hopper, and the relevant hopper end wall. As shown in FIG. 9, the outer end of the shaft 64 extends through the hopper end wall. A crank 66 is attached to the protruding outer end of the shaft 64. A pneumatically powered air pot 67 is mounted to the hopper end wall. The shaft 68 of the air pot is connected with the crank 66, for opening and closing the flap assembly. A hose (not shown) supplies compressed air to the air pot 67 from the truck air system (not shown) which is controlled from the truck cab in conventional fashion. A safety spring 70 is connected between the crank 66 and hopper side wall.

Thus each flap assembly 14 or 15 can be pneumatically operated to open or close the relevant open upper portion of the slot 3. When the flap assembly is in the closed position, the flap 62 bears firmly against the surface of the drum and provides a positive seal and closure.

In operation, when the rear gate of the truck box is opened, a thin layer of aggregate flows down over the ramp 8. The rotating agitator 10 assists in moving the aggregate over the ramp. We have found that the combination of ramp and agitator distributes and feeds the aggregate evenly to the drum assembly 4. One or both drums 5, 6 can be actuated and one or both flap assemblies 14, 15 can be opened whereby aggregate is discharged to provide a narrow or broad strip. The combined actions of each spring 70 and air pot 67 function to firmly pull the relevant flap 62 into tight sealing engagement with its associated drum to close the open slot portion and prevent the escape of aggregate.

The embodiments of the invention in which an exclusive property or privilege is claimed are defined as follows:

1. A hopper spreader for use with a truck box to spread aggregate, comprising:

an elongated hopper adapted to be mounted across the rear end of a truck box in an underslung position for receiving aggregate from the box;

the hopper having side, front and rear walls and forming an elongated slot in its lower end for discharging aggregate;

the slot having upper and lower portions;

a pair of drums having outer and inner ends and arranged in coaxial end-to-end relationship, said drums being positioned within the hopper, said drums extending along and protruding through the lower portion of the slot, said drums being rotatably supported at their outer ends by the hopper end walls;

bearing means, positioned within the drums at their inner ends, for rotatably supporting the drum inner ends;

drive means for separately rotating each drum;

the hopper front wall comprising ramp means, for extending between the rear lip of the truck box and the drums, for conveying aggregate to the drums;

a pair of flap assemblies, pivotally mounted to the hopper, for opening and closing the upper portions of the slot above the pair of drums; and means for separately actuating each of the flap assemblies;

whereby the drums and flap members can be selectively operated to deposit either a narrow or wide strip of aggregate.

2. The hopper spreader as set forth in claim 1 wherein:

each flap assembly comprises a flap operative to bear against the upper rear portion of one of the drums to close the upper portion of the slot above that drum.

3. The hopper spreader as set forth in claim 1 comprising:

means for agitating the aggregate to break down lumps as the aggregate passes over the ramp.

4. The hopper spreader as set forth in claim 2 comprising:

means for agitating the aggregate to break down lumps as the aggregate passes over the ramp.

\* \* \* \* \*